United States Patent
Herman (10) Patent No.: US 12,306,339 B2
(45) Date of Patent: May 20, 2025

(54) VEHICLE REFLECTION IDENTIFICATION

(71) Applicant: Ford Global Technologies, LLC, Dearborn, MI (US)

(72) Inventor: David Michael Herman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 18/349,203

(22) Filed: Jul. 10, 2023

(65) Prior Publication Data

US 2025/0020776 A1    Jan. 16, 2025

(51) Int. Cl.

| | |
|---|---|
| G01S 7/48 | (2006.01) |
| B60Q 1/04 | (2006.01) |
| B60Q 1/30 | (2006.01) |
| B60Q 1/34 | (2006.01) |
| B60T 7/12 | (2006.01) |
| B62D 15/02 | (2006.01) |
| G01S 7/484 | (2006.01) |
| G01S 17/931 | (2020.01) |

(52) U.S. Cl.
CPC .............. *G01S 7/4802* (2013.01); *B60Q 1/04* (2013.01); *B60Q 1/30* (2013.01); *B60Q 1/346* (2013.01); *B60T 7/12* (2013.01); *B62D 15/026* (2013.01); *G01S 7/484* (2013.01); *G01S 17/931* (2020.01); *B60Q 2300/40* (2013.01)

(58) Field of Classification Search
CPC ...... G01S 7/4802; G01S 7/484; G01S 17/931; B60Q 1/04; B60Q 1/30; B60Q 1/346; B60Q 2300/40; B60T 7/12; B62D 15/026
USPC ............................................. 701/41–44, 70
See application file for complete search history.

(56) References Cited

U.S. PATENT DOCUMENTS

| | | | |
|---|---|---|---|
| 10,399,483 B2 | 9/2019 | Johnson et al. | |
| 2022/0043157 A1 | 2/2022 | Chen et al. | |
| 2022/0276375 A1 | 9/2022 | Armstrong-Crews | |
| 2023/0017983 A1 | 1/2023 | Kunz et al. | |

FOREIGN PATENT DOCUMENTS

DE     102019216373 A1     4/2021

OTHER PUBLICATIONS

Goto et al., "A New Automotive VLC System Using Optical Communication Image Sensor", vol. 8, No. 3, Jun. 2016, DOI: 10.1109/JPHOT.2016.2555582 1943-0655 copyright 2016 IEEE.

*Primary Examiner* — Hai H Huynh
(74) *Attorney, Agent, or Firm* — Frank Lollo; Brooks Kushman P.C.

(57) ABSTRACT

A computer includes a processor and a memory, and the memory stores instructions executable by the processor to determine a value over time derived from a region of sensor data from an optical sensor of a host vehicle; determine that the value over time matches a stored temporal pattern; upon determining that the value over time matches the stored temporal pattern, classify an object at the region as a surface reflecting a signal from an illuminator of an origin vehicle; and actuate a component of the host vehicle based on a classification of the object at the region.

20 Claims, 6 Drawing Sheets

VEHICLE REFLECTION IDENTIFICATION

BACKGROUND

Object recognition can be used to identify a type or classification of an object appearing in image data. A computer can identify the object using conventional image-recognition techniques, e.g., a convolutional neural network programmed to accept images as input and output an identification. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type for the object, and the final output is the type with the highest score. The computer can store a set of potential types for objects, e.g., {vehicle, bicycle, pedestrian, deer, pole, . . . }.

DETAILED DESCRIPTION

This disclosure describes techniques for identifying surfaces reflecting light from an illuminator on an origin vehicle. The illuminator may emit light according to a stored temporal pattern such as a visible light communication (VLC) signal. The term "origin vehicle" is used to indicate a vehicle from which the light originated. The origin vehicle may be the host vehicle or may be a target vehicle, i.e., another vehicle besides the host vehicle. A computer of the host vehicle is programmed to determine a value over time derived from a region of sensor data from an optical sensor of the host vehicle, determine that the value over time matches a stored temporal pattern, and upon so determining, classify an object at the region as a surface reflecting a signal from the illuminator of the origin vehicle. For example, the computer may have identified a potential target vehicle, and the region may be a light source on the potential target vehicle. If a value such as intensity of the region matches the stored temporal pattern over time, then the potential target vehicle is in fact not a vehicle but rather a reflection of the origin vehicle (i.e., of the host vehicle or of an already known target vehicle). The computer actuates a component of the host vehicle based on the classification. The computer may therefore treat the reflection as a nonvehicle rather than as a vehicle for the purposes of actuating the host vehicle.

A computer includes a processor and a memory, and the memory stores instructions executable by the processor to determine a value over time derived from a region of sensor data from an optical sensor of a host vehicle; determine that the value over time matches a stored temporal pattern; upon determining that the value over time matches the stored temporal pattern, classify an object at the region as a surface reflecting a signal from an illuminator of an origin vehicle; and actuate a component of the host vehicle based on a classification of the object at the region.

In an example, the origin vehicle may be the host vehicle, and the instructions may further include instructions to instruct the illuminator to illuminate according to the stored temporal pattern.

In an example, the stored temporal pattern may be a visible light communication (VLC) signal. In a further example, the VLC signal may be a pulse-based transmission.

In an example, the instructions may further include instructions to identify a potential vehicle in the sensor data, the region being part of the potential vehicle. In a further example, the instructions may further include instructions to, upon determining that the value over time matches the stored temporal pattern, classify the potential vehicle as a nonvehicle.

In another further example, the instructions may further include instructions to, upon determining that the value over time does not match the stored temporal pattern, classify the potential vehicle as a vehicle.

In another further example, the instructions may further include instructions to identify a light source of the potential vehicle, the region corresponding to the light source. In a yet further example, the instructions may further include instructions to, upon determining that the value over time derived from a second region of the sensor data matches the stored temporal pattern, refrain from classifying the potential vehicle as a nonvehicle, the second region corresponding to a portion of the potential vehicle other than the light source.

In an example, the instructions may further include instructions to determine a phase offset between the value over time and the stored temporal pattern. In a further example, the instructions may further include instructions to determine a distance to the surface based on the phase offset.

In an example, the instructions may further include instructions to determine that the value over time includes multiple matches of the stored temporal pattern, and upon determining that the value over time includes multiple matches of the stored temporal pattern, filter out one match of the stored temporal pattern from the value over time. In a further example, the instructions may further include instructions to determine phase offsets of the matches, and select one match of the matches to filter out based on the phase offsets.

In an example, the value over time may be an intensity value.

In an example, the optical sensor may be a camera.

In an example, the origin vehicle may be the host vehicle, and the illuminator may be incorporated into the optical sensor. In a further example, the optical sensor may be one of a lidar or a radar.

In an example, the origin vehicle may be the host vehicle, and the illuminator may be at least one of a headlight, a daytime running light, a taillight, or a turn signal of the host vehicle.

In an example, the component of the host vehicle may include at least one of a brake system or a steering system.

A method includes determining a value over time derived from a region of sensor data from an optical sensor of a host vehicle; determining that the value over time matches a stored temporal pattern; upon determining that the value over time matches the stored temporal pattern, classifying an object at the region as a surface reflecting a signal from an illuminator of an origin vehicle; and actuating a component of the host vehicle based on a classification of the object at the region.

With reference to the Figures, wherein like numerals indicate like parts throughout the several views, a computer 105 includes a processor and a memory, and the memory stores instructions executable by the processor to determine a value over time derived from a region 305 of sensor data 300 from an optical sensor 110 of a host vehicle 100; determine that the value over time matches a stored temporal pattern; upon determining that the value over time matches the stored temporal pattern, classify an object 205 at the region 305 as a surface 215 reflecting a signal from an illuminator 115 of an origin vehicle; and actuate a component of the host vehicle 100 based on a classification of the object 205 at the region 305.

Figure 1:
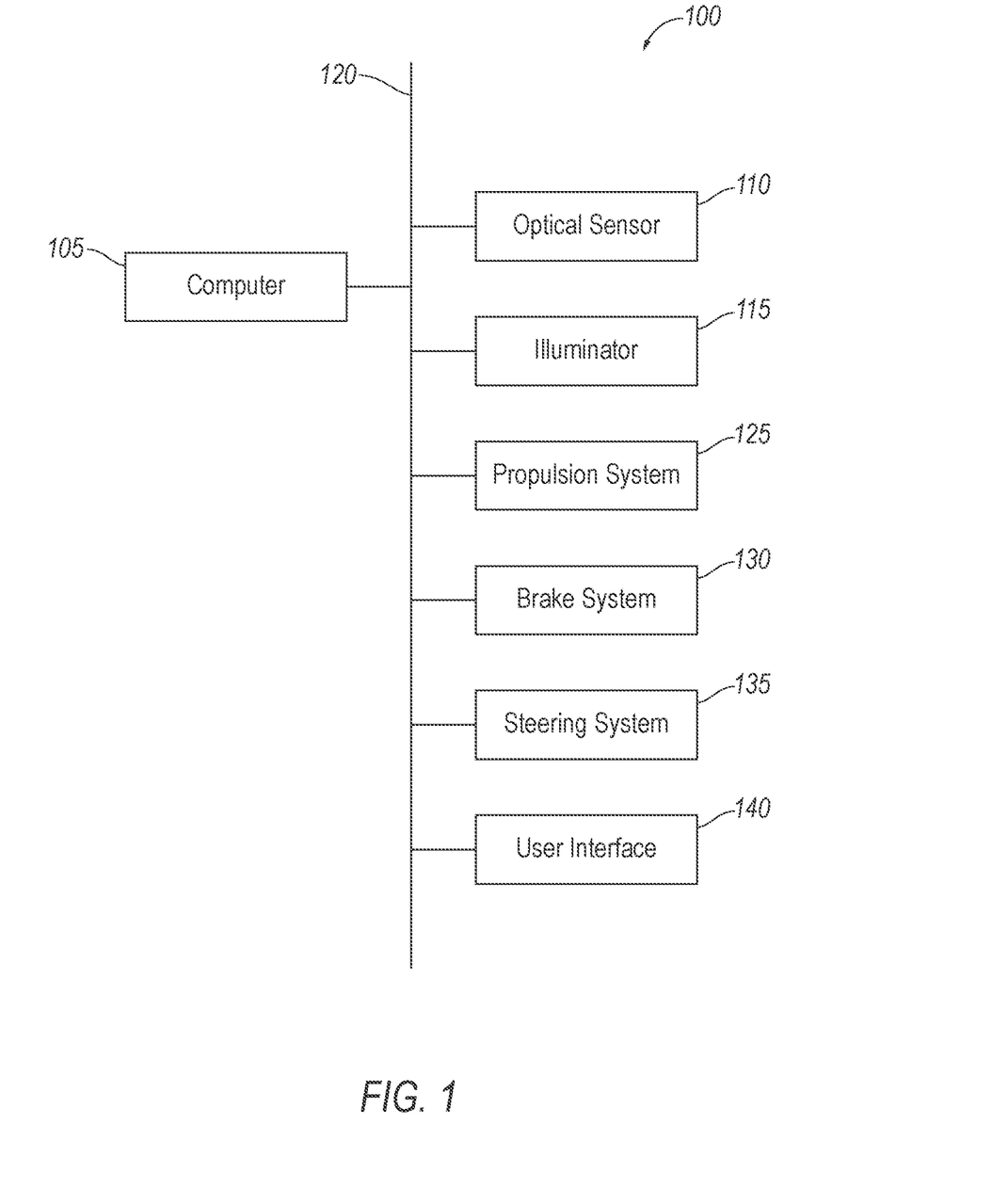
FIG. 1 is a block diagram of an example host vehicle with a sensor and an illuminator.

With reference to FIG. 1, the host vehicle 100 may be any passenger or commercial automobile such as a car, a truck, a sport utility vehicle, a crossover, a van, a minivan, a jeepney, a taxi, a bus, etc. The host vehicle 100 may include the computer 105, the optical sensor 110, the illuminator 115, a communications network 120, a propulsion system 125, a brake system 130, a steering system 135, and a user interface 140.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 120. The communications network 120 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the optical sensor 110, the illuminator 115, the propulsion system 125, the brake system 130, the steering system 135, the user interface 140, and other components via the communications network 120.

The optical sensor 110 may detect the external world, e.g., objects 205 and/or characteristics of surroundings of the host vehicle 100, such as other vehicles, road lane markings, traffic lights and/or signs, pedestrians, etc. The optical sensor 110 detects light, i.e., electromagnetic radiation in some range of wavelengths. For example, the optical sensor 110 may be a camera able to detect visible light, infrared radiation, ultraviolet light, or some range of wavelengths including visible, infrared, and/or ultraviolet light. For example, the camera can be a complementary metal oxide semiconductor (CMOS), charge-coupled device (CCD), or any other suitable type. For another example, the camera may be a time-of-flight (TOF) camera, which incorporates the illuminator 115 for illuminating the environment 200 and detects both reflected light from the modulated illuminator 115 and ambient light to sense reflectivity amplitudes and distances to the scene. For another example, the camera may be an event camera, for which pixels in the image frame are asynchronously updated in response to changes in brightness. For another example, the optical sensor 110 may be a lidar, e.g., a scanning lidar device. A lidar detects distances to objects 205 by emitting laser pulses at a particular wavelength from the illuminator 115 and measuring the time of flight for the pulse to travel to the object 205 and back. The lidar device can be any suitable type for providing the lidar data on which the computer 105 can act, e.g., spindle-type lidar, solid-state lidar, flash lidar, etc. For another example, the optical sensor 110 may be a radar. The radar includes the illuminator 115 that transmits radio waves, and the radar receives reflections of those radio waves to detect the objects 205 in the environment 200. The radar can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves.

The illuminator 115 emits light in wavelengths detectable by the optical sensor 110. For example, the illuminator 115 may be incorporated into the optical sensor 110, e.g., into a TOF camera, lidar, or radar, as described above. For another example, the illuminator 115 may be at least one of a headlight, a daytime running light, a taillight, or a turn signal of the host vehicle 100. The headlights may be fixed relative to the host vehicle 100 and disposed at a front of the host vehicle 100 facing in a vehicle-forward direction. The taillights may be fixed relative to the host vehicle 100 and disposed at a rear of the host vehicle 100 facing in a vehicle-rearward direction. The turn signals may be fixed relative to the host vehicle 100 and disposed at corners of the host vehicle 100. One lamp or set of lamps may operate as both a taillight and a turn signal. The illuminator 115 may be any lighting system suitable for illuminating a roadway in front of the host vehicle 100 or being easily visible to other vehicles, including tungsten, halogen, high-intensity discharge (HID) such as xenon, light-emitting diode (LED), laser, etc.

The computer 105 may be programmed to instruct the illuminator 115 to illuminate according to the stored temporal pattern. The stored temporal pattern may be a preset sequence of modulations by the illuminator 115 over a time period. The stored temporal pattern can be represented as a function of time, e.g., $1=f(1)$, in which/is the intensity and t is time. The function of time may have a more complex representation to accommodate physical features of the optical sensor 110, e.g., exposure time, multi-exposure approaches, subpixel approaches, and row read-off time. The function may encode a string of characters or symbols, e.g., an identification number or some other string that uniquely identifies the host vehicle 100. For example, the stored temporal pattern may be a visible light communication (VLC) signal, which is the use of visible light as a transmission medium in telecommunications. The VLC signal may be any suitable type for transmission by the illuminator 115 and detection by the optical sensor 110, e.g., single-carrier modulated transmission such as by amplitude switch keying, phase switch keying, or frequency switch keying; multi-carrier modulated transmission; or pulse-based transmission such as by on-off keying, variable pulse position modulation, or color shift keying. In particular, the VLC signal may be a pulse-based transmission, in which data is encoded as a pulsed wave, making it particularly suitable for the types of illuminators 115 used for vehicles. For a pulse-based transmission, the stored temporal pattern I=f(1) may have a binary output.

The propulsion system 125 of the host vehicle 100 generates energy and translates the energy into motion of the host vehicle 100. The propulsion system 125 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 125 can include an electronic control unit (ECU) or the like that is in communication with and receives input from the computer 105 and/or a human operator. The human operator may control the propulsion system 125 via, e.g., an accelerator pedal and/or a gear-shift lever.

The brake system 130 is typically a conventional vehicle braking subsystem and resists the motion of the host vehicle 100 to thereby slow and/or stop the host vehicle 100. The brake system 130 may include friction brakes such as disc brakes, drum brakes, band brakes, etc.; regenerative brakes; any other suitable type of brakes; or a combination. The brake system 130 can include an electronic control unit (ECU) or the like that is in communication with and receives input from the computer 105 and/or a human operator. The human operator may control the brake system 130 via, e.g., a brake pedal.

The steering system 135 is typically a conventional vehicle steering subsystem and controls the turning of the wheels. The steering system 135 may be a rack-and-pinion system with electric power-assisted steering, a steer-by-wire system, as both are known, or any other suitable system. The steering system 135 can include an electronic control unit (ECU) or the like that is in communication with and receives input from the computer 105 and/or a human operator. The human operator may control the steering system 135 via, e.g., a steering wheel.

The user interface 140 presents information to and receives information from an operator of the host vehicle 100. The user interface 140 may be located, e.g., on an instrument panel in a passenger compartment of the host vehicle 100, or wherever may be readily seen by the operator. The user interface 140 may include dials, digital readouts, screens, speakers, and so on for providing information to the operator, e.g., human-machine interface (HMI) elements such as are known. The user interface 140 may include buttons, knobs, keypads, microphone, and so on for receiving information from the operator.

Figure 2A:
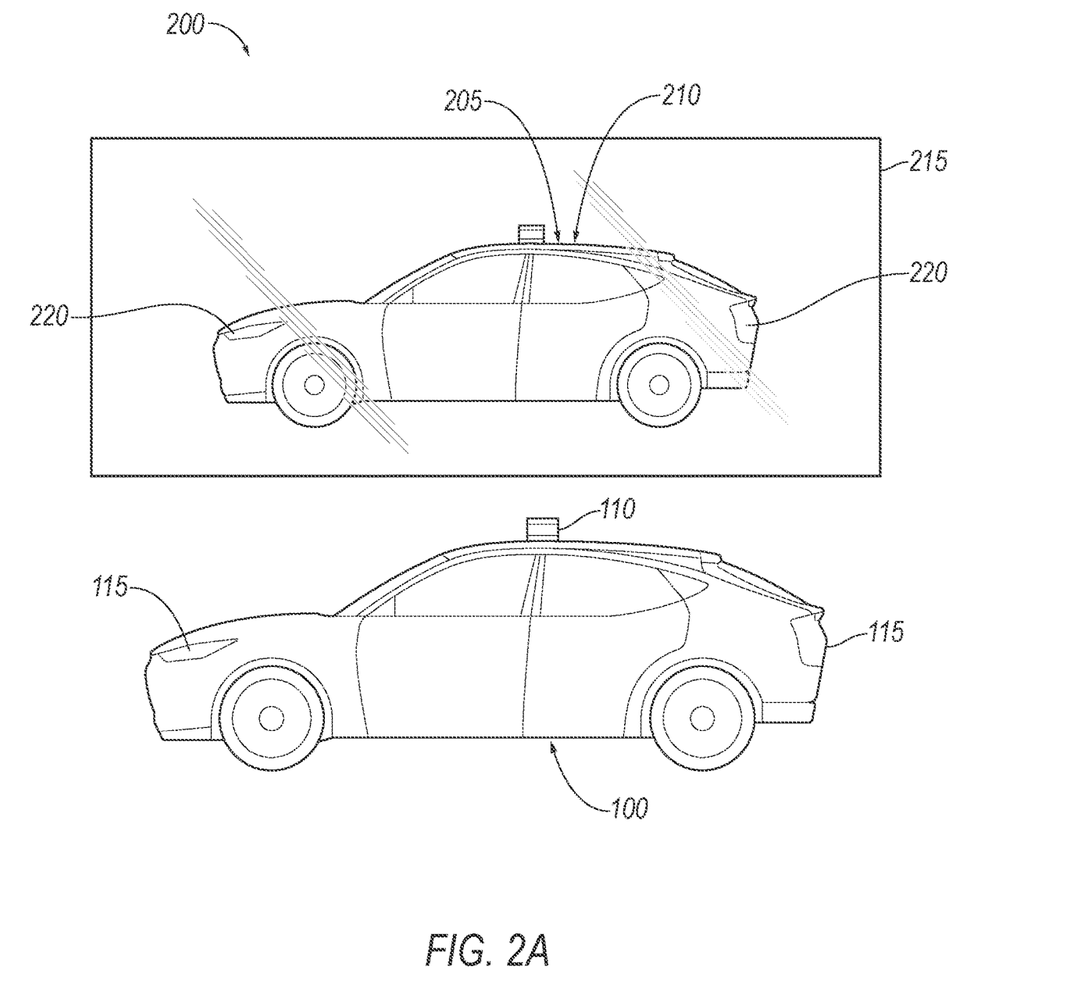
FIG. 2A is a diagram of an example scenario in which the sensor detects a reflection of the host vehicle.
Figure 2B:
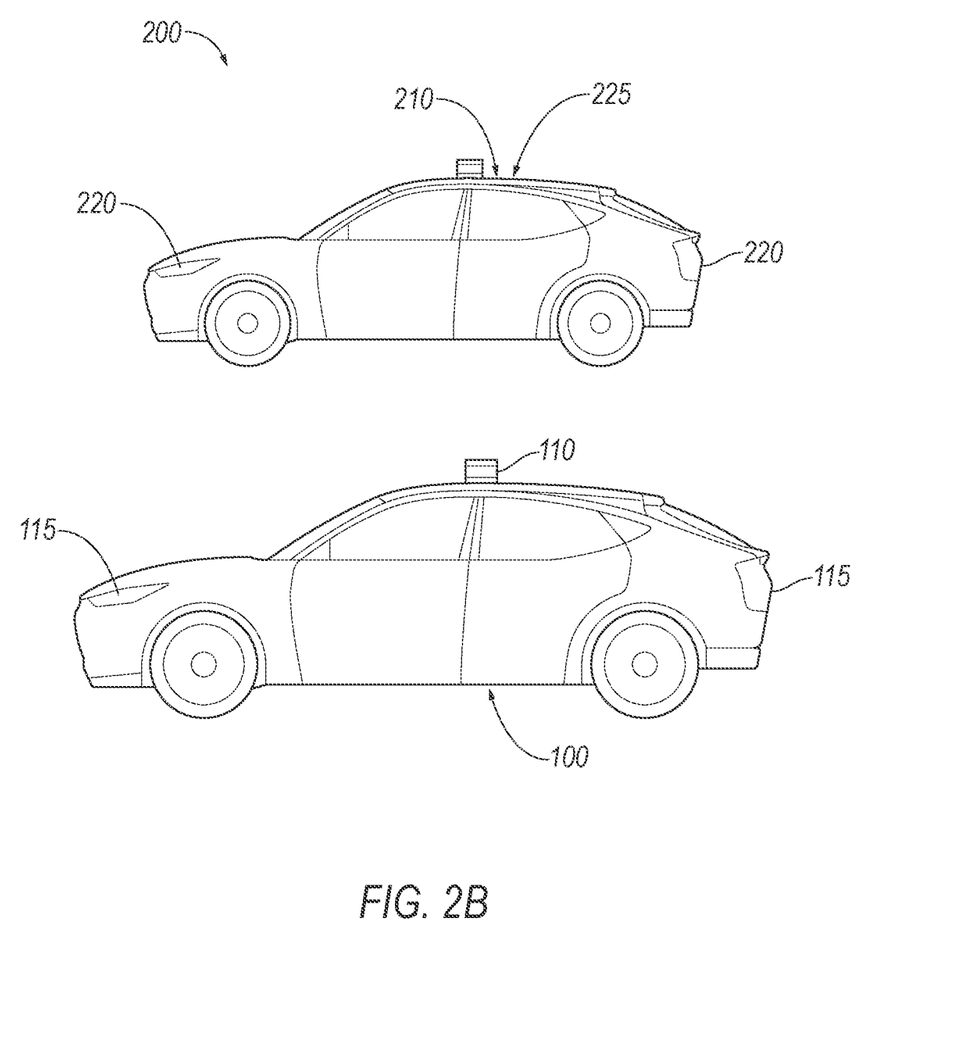
FIG. 2B is a diagram of an example scenario in which a target vehicle is traveling next to the host vehicle.
Figure 2C:
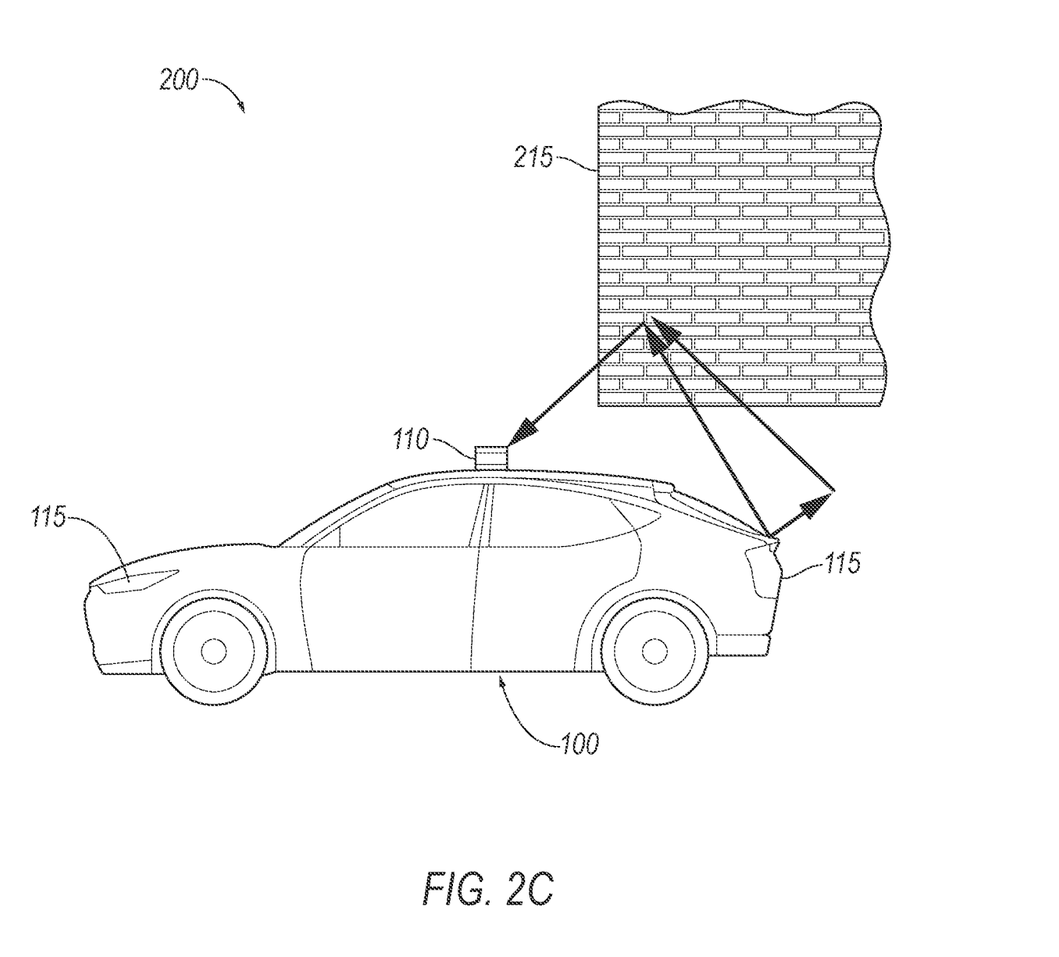
FIG. 2C is a diagram of an example scenario in which the sensor of the host vehicle detects a surface reflecting light from the illuminator.

With reference to FIGS. 2A-C, the techniques herein may help the computer 105 determine characteristics of the surroundings in different scenarios, and thereby travel through an environment 200. FIG. 2A shows the host vehicle 100 traveling next to a reflective surface 215, such as a large window or bank of windows, that is oriented to reflect an image of the host vehicle 100 toward the host vehicle 100. FIG. 2B shows the host vehicle 100 traveling next to a target vehicle 225 that is similar in appearance to the host vehicle 100. The techniques herein may help the computer 105 differentiate between these two scenarios by taking advantage of the stored temporal pattern. Similarly, the techniques herein may help the computer 105 determine whether what appears to be a target vehicle 225 is a distinct target vehicle 225 or a reflection of an already identified target vehicle 225. FIG. 2C shows the host vehicle 100 traveling next to an object 205 such as a wall that may reflect light from the illuminator 115. The reflected light may be both direct, i.e., traveling from the illuminator 115 to the object 205 and back to the optical sensor 110, or indirect, i.e., traveling from the illuminator 115 to one or more other surfaces before reflecting off of the object 205 back to the optical sensor 110. The techniques herein may use the stored temporal pattern to determine, e.g., a distance to the object 205.

Figure 3:
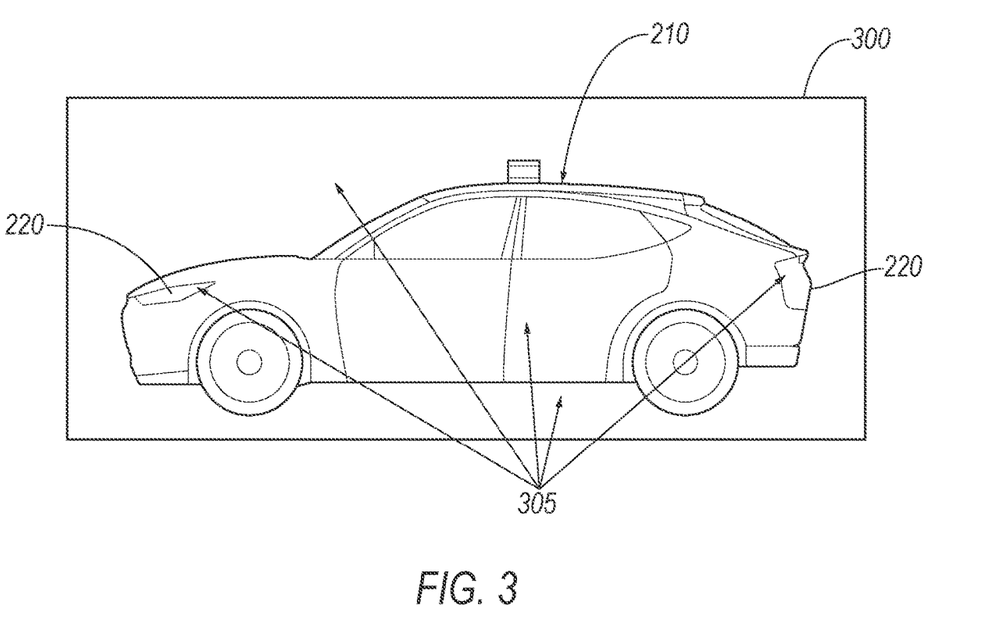
FIG. 3 is a representation of example data from the sensor of the host vehicle.

With reference to FIG. 3, the computer 105 is programmed to receive sensor data 300 from the optical sensor 110. For example, the sensor data 300 may be image data. The image data are a sequence of image frames of the field of view of the optical sensor 110. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the image frame.

For another example, the sensor data 300 may be range data. The range data may be, e.g., a point cloud. The points of the point cloud specify respective positions in the environment 200 relative to the position of the optical sensor 110. For example, the range data can be in spherical coordinates with the optical sensor 110 at the origin of the spherical coordinate system. The spherical coordinates can include a radial distance, i.e., a measured depth from the optical sensor 110 to the point measured by the ranging sensor; a polar angle, i.e., an angle from a vertical axis through the optical sensor 110 to the point measured by the optical sensor 110; and an azimuthal angle, i.e., an angle in a horizontal plane from a horizontal axis through the optical sensor 110 to the point measured by the optical sensor 110. The horizontal axis can be, e.g., along a vehicle-forward direction. Alternatively, the optical sensor 110 can return the points as Cartesian coordinates with the optical sensor 110 at the origin or as coordinates in any other suitable coordinate system, or the computer 105 can convert the spherical coordinates to Cartesian coordinates or another coordinate system after receiving the range data.

The computer 105 may be programmed to divide the sensor data 300 into regions 305. For example, the computer 105 may be programmed to segment each image, i.e., partition each image into regions 305, by executing a semantic segmentation algorithm. A semantic segmentation algorithm labels each pixel in an image with a category. The categories can be stored in the computer 105 as a list, e.g., {road, sidewalk, ground, trees, target vehicle 225, bicycle, pedestrian, animal, building/wall, traffic sign, traffic light, light source 220, sky, . . . }. Each region 305 may be a contiguous area of one category. The semantic segmentation algorithm can be a machine-learning algorithm, e.g., a deep neural network, a convolutional neural network, etc. For another example, the computer 105 may execute an instance segmentation algorithm. An instance segmentation algorithm divides an image into the distinct objects shown in the image, each of which may be a region 305. The instance segmentation algorithm can be a machine-learning algorithm, e.g., a deep neural network, a convolutional neural network, etc. For another example, the computer 105 may execute a panoptic segmentation algorithm, which is a combination of semantic segmentation and instance segmentation.

The computer 105 is programmed to determine a value over time derived from a region 305 of sensor data 300. The value is some quantity that is capable of encoding the stored temporal pattern. For example, the value may be an intensity value, which can encode the stored temporal pattern in pulse-based transmission by switching between a high value and a low value. For another example, the value may be a measure of one or more colors. The computer 105 tracks the value as the value changes over time. In other words, the value over time is time-series data. As will be generally understood, and for purposes of this disclosure, time-series data are values of some quantity at discrete successive points of time.

The computer 105 may be programmed to, in response to data indicating that the region 305 is a light source 220 of a target vehicle 225, store the value over time in the memory of the computer 105 as a stored temporal pattern. The stored temporal pattern from the light source 220 may be a preset sequence of modulations of the light source 220 such as an encoded string as described above for the illuminator 115. Alternatively, the stored temporal pattern may be a pattern of flickering characteristic to the light source 220, e.g., resulting from pulse-width modulation (PWM) used for activating the light source 220. For example, the data indicating that the region 305 is a light source 220 of a target vehicle 225 may be derived from other sensors of the host vehicle 100 besides the optical sensor 110, e.g., lidar data if the optical sensor 110 is a camera. For another example, the data indicating that the region 305 is a light source 220 of a target vehicle 225 may be a vehicle-to-vehicle (V2V) communication from the target vehicle 225 to the host vehicle 100. Alternatively to storing the value over time, the V2V communication from the target vehicle 225 may include the stored temporal pattern for the light source 220 of the target vehicle 225, and the computer 105 may store the stored temporal pattern from the V2V communication in memory.

The computer 105 is programmed to determine whether the value over time matches the stored temporal pattern for each region 305 for which the computer 105 tracks the value. The stored temporal pattern may be the stored temporal pattern for illuminating the illuminator 115 of the host vehicle 100, as described further above, or the stored temporal pattern may be a stored temporal pattern from a light source 220 of a known target vehicle 225, as described immediately above. For example, the stored temporal pattern may be encoded as a string of characters, and the computer 105 may decode the value over time into a string of characters and check whether the sequences are same. The computer 105 may also shift the stored temporal sequence along the decoded characters when checking whether the sequences are the same, in order to detect the stored temporal pattern that has been phase-shifted because of the travel time from the illuminator 115 back to the optical sensor 110. For another example, the computer 105 may apply a matched filter to the value over time. The term "matched filter" is used in its signal-processing sense of correlating a known delayed signal, or template, with an unknown signal to detect the presence of the template in the unknown signal. The matched filter may be mathematically equivalent to convolving the value over time from the region 305 with a conjugated time-reversed version of the stored temporal pattern.

The computer 105 is programmed to, upon determining that the value over time for a region 305 matches the stored temporal pattern, classify an object 205 at the region 305 as a surface 215 reflecting a signal from the illuminator 115. As described in more detail below, if the object 205 is a light source 220 of a potential vehicle 210, the computer 105 may classify the object 205 as a nonvehicle. As also described below, the computer 105 may determine a distance to the surface 215 in response to classifying the object 205 as a surface 215 reflecting a signal from the illuminator 115.

The computer 105 may be programmed to identify a potential vehicle 210 in the sensor data 300. The computer 105 can identify the potential vehicles 210 using conventional image-recognition techniques, e.g., a convolutional neural network programmed to accept images as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, and the final output is the type with the highest score. The object 205 is a potential vehicle 210 when the type "vehicle" or "potential vehicle" has the highest score. The classification as a potential vehicle 210 may be a classification as a "vehicle" before the steps below occur.

The computer 105 may be programmed to identify a light source 220 of the potential vehicle 210. For example, the computer 105 may identify a region 305 of the sensor data 300 within the potential vehicle 210 for which a brightness or a contrast with surrounding regions 305 is above a threshold. The threshold may be chosen to be below a brightness or contrast of a typical illuminator of a same type as the illuminator 115 and above a background brightness or typical contrast between regions 305. The portion of the sensor data 300 corresponding to the light source 220 of the potential vehicle 210 may be the region 305 for which the value is tracked and compared to the stored temporal pattern, as described above.

The computer 105 may be programmed to, upon determining that the value over time for the region 305 corresponding to the light source 220 matches the stored temporal pattern, classify the potential vehicle 210 as a surface 215 reflecting the signal from the illuminator 115 of an origin vehicle, i.e., as a nonvehicle, e.g., as in the scenario of FIG. 2A. For example, if the signal emitted from the light source 220 of the potential vehicle 210 matches the stored temporal pattern emitted by the illuminator 115 of the host vehicle 100, the computer 105 determines that the potential vehicle 210 is actually a reflection of the host vehicle 100, as in FIG. 2A, rather than a distinct target vehicle 225, as in FIG. 2B. For another example, if the signal emitted from the light source 220 of the potential vehicle 210 matches the stored temporal pattern emitted by the illuminator 115 of an already detected target vehicle 225, the computer 105 determines that the potential vehicle 210 is actually a reflection of the target vehicle 225, rather than a second target vehicle 225.

The computer 105 may be programmed to, upon determining that the value over time for the region 305 corresponding to the light source 220 does not match the stored temporal pattern, classify the potential vehicle 210 as a vehicle, i.e., as in the scenario of FIG. 2B. Because the signal emitted from the light source 220 of the potential vehicle 210 does not match the stored temporal pattern emitted by the illuminator 115 of the origin vehicle, the computer 105 determines that the potential vehicle 210 is not a reflection of the origin vehicle but instead a distinct target vehicle 225. The computer 105 may classify the potential vehicle 210 as a vehicle by changing the classification from "potential vehicle" to "vehicle" or by maintaining a classification of "vehicle" after comparing the light source 220 to the stored temporal pattern.

The computer 105 may be programmed to, upon determining that the value over time derived from a different region 305 of the sensor data 300 than the light source 220 matches the stored temporal pattern, refrain from classifying the potential vehicle 210 as a nonvehicle. The region 305 of interest for this determination may correspond to a portion of the potential vehicle 210 other than the light source 220. The classification of the potential vehicle 210 as a nonvehicle or as a vehicle therefore depends on the light source 220 matching the stored temporal pattern, not other portions of the potential vehicle 210 matching the stored temporal pattern. If light sources 220 of the potential vehicle 210 are not visible to the optical sensor 110, then the computer 105 may classify the potential vehicle 210 as a vehicle. This step prevents an erroneous classification as a nonvehicle based on light from the illuminator 115 reflected off of the target vehicle 225.

The computer 105 may be programmed to, for each region 305 matching the stored temporal pattern, determine a phase offset between the value over time and the stored temporal pattern for that region 305. The term "phase offset," also called "phase shift," refers to the value over time matching the stored temporal pattern if the stored temporal pattern were shifted in time by some fraction of the duration of the stored temporal pattern. The computer 105 may determine a difference between a time at which a reference point in the stored temporal pattern was emitted by the illuminator 115 and a time at which the reference point arrives in the light detected by the optical sensor 110.

The computer 105 may be programmed to determine that the value over time includes multiple matches of the stored temporal pattern. The value over time for the region 305 may include multiple copies of the stored temporal pattern superimposed over each other, leading to multiple matches. This can occur when the light emitted by the illuminator 115 follows multiple different paths with an overlapping final leg ending at the optical sensor 110, e.g., one path from the illuminator 115 to an object 205 and directly reflecting off of the object 205 back to the optical sensor 110, and another path from the illuminator 115 to a surface and then reflecting to the object 205 and finally reflecting off of the object 205 back to the optical sensor 110. For example, in the scenario of FIG. 2C, the light emitted from the illuminator 115 may reflect off of the object 205 (in this example, a wall) back to the optical sensor 110, and the light may also reflect off of the roadway to the object 205 and then back to the optical sensor 110. For example, the computer 105 may apply a matched filter as described above, and the matched filter may return multiple matches.

The computer 105 may be programmed to, upon determining that the stored temporal pattern matches the value over time from a region 305 includes multiple matches of the stored temporal pattern, filter one match of the stored temporal pattern from the value over time. The computer 105 may determine the phase offsets of the matches in the manner described above, and the computer 105 may select one match of the matches to filter out based on the phase offsets. The computer 105 may select the copy of the stored temporal pattern having the greater phase offset to be filtered out. For example, the computer 105 may add a signal to the value over time, the signal including the negative of the stored temporal pattern with a phase offset equaling the phase offset of the match selected to be filtered out.

The computer 105 may be programmed to, upon classifying an object 205 as a surface 215 reflecting the signal from the illuminator 115, determine a distance to the surface 215 based on the phase offset. For example, the distance may be based on the phase offset and the frequency of the stored temporal pattern, i.e., the number of times the stored temporal pattern is emitted per unit time, e.g., as in the following equation:

$$L = \frac{c\phi}{2\pi f}$$

in which L is the distance to the surface 215, c is the speed of light, φ is the phase offset, and f is the frequency of the stored temporal pattern. The computer 105 may use the phase offset of the copy of the stored temporal pattern remaining in the value over time after filtering out any multiple copies.

The computer 105 may be programmed to actuate a component of the host vehicle 100 based on the classification of the object 205 at the region 305 and/or based on the distance to the object 205 at the region 305. The component may include, e.g., the propulsion system 125, the brake system 130, the steering system 135, the user interface 140, and/or other vehicle systems. In other words, various vehicle systems, including the propulsion system 125, the brake system 130, the steering system 135, and/or the user interface 140, can accept control inputs determined based on an object classification, and therefore could accept inputs based on a classification of an object 205 as described herein. For example, the computer 105 may actuate the component in executing an advanced driver assistance system (ADAS). ADAS are electronic technologies that assist drivers in driving and parking functions. Examples of ADAS include forward collision detection, lane-departure detection, blind-spot detection, automatic braking, adaptive cruise control, and lane-keeping assistance. For example, the computer 105 may actuate the brake system 130 or steering system 135 in response to a vehicle turning toward a path of the host vehicle 100, e.g., according to an automatic braking algorithm, or the computer 105 may actuate the user interface 140 in response to a vehicle turning toward a path of the host vehicle 100, e.g., according to a collision detection algorithm. If a potential vehicle 210 is classified as a nonvehicle as described above, then the computer 105 would not make the determination of a vehicle turning toward the path of the host vehicle 100. The computer 105 may operate the host vehicle 100 autonomously, i.e., actuating the propulsion system 125, the brake system 130, and the steering system 135 based on data from the optical sensor 110, e.g., to navigate around an object 205 detected by the optical sensor 110, e.g., based on the distance determined from the phase offset. The computer 105 may actuate the component based on the distances from the phase offsets by combining the distances with other data from other sensors, e.g., using sensor fusion, and actuating the component based on the combined (fused) data.

Figure 4:
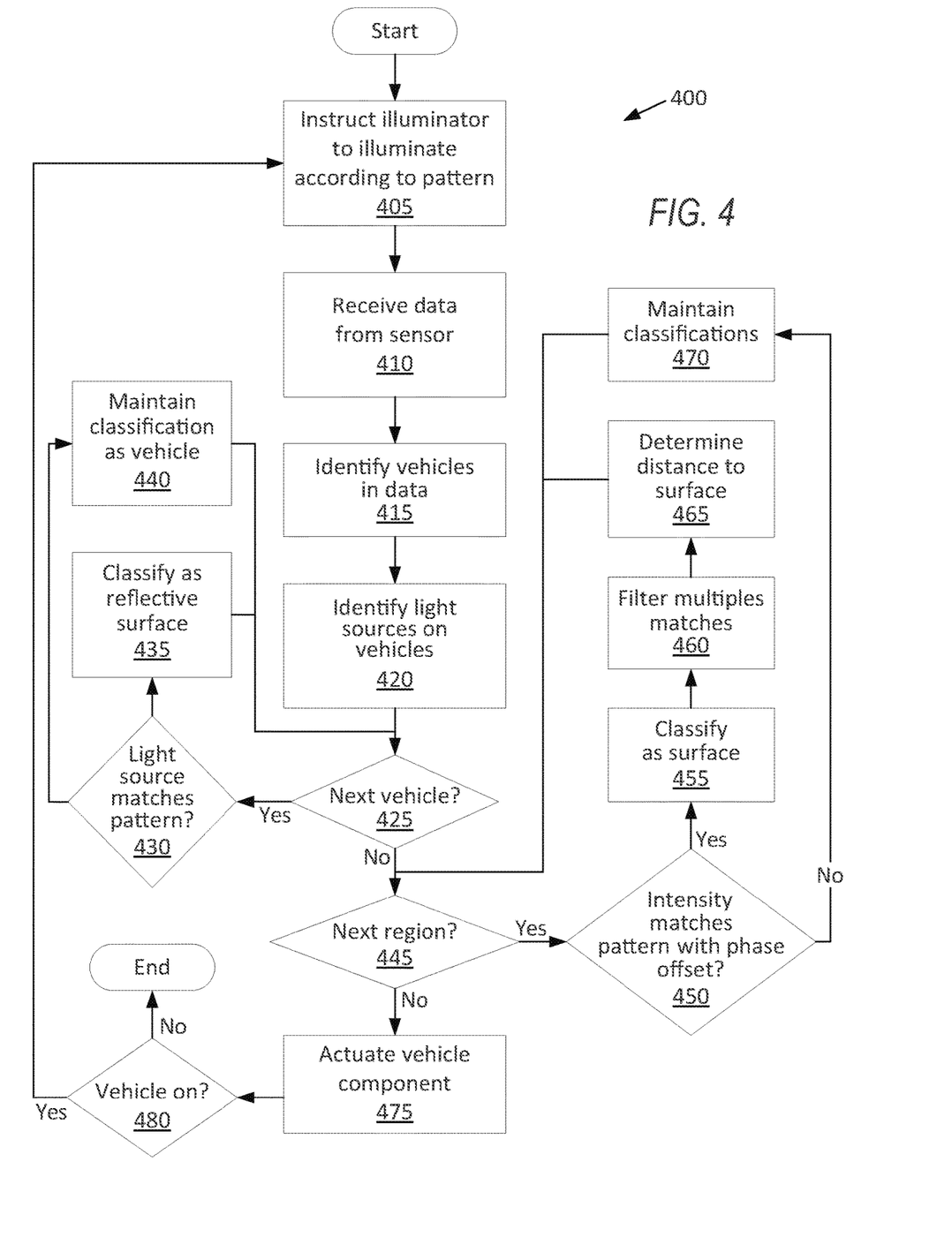
FIG. 4 is a flowchart of an example process for operating the host vehicle based on detecting light emitted by the illuminator.

FIG. 4 is a flowchart illustrating an example process 400 for operating the host vehicle 100 based on detecting light emitted by the illuminator 115. The memory of the computer 105 stores executable instructions for performing the steps of the process 400 and/or programming can be implemented in structures such as mentioned above. As a general overview of the process 400, the computer 105 instructs the illuminator 115 to illuminate according to the stored temporal pattern, receives sensor data 300 from the optical sensor 110, identifies potential vehicles 210 from the sensor data 300, and identifies light sources 220 of the potential vehicles 210. For each potential vehicle 210, the computer 105 classifies the potential vehicle 210 as a nonvehicle in response to the value over time for the light source 220 matching the stored temporal pattern and classifies the potential vehicle 210 as a vehicle otherwise. For each region 305 in the sensor data 300 having a value over time matching the stored temporal pattern, the computer 105 classifies the object 205 in that region 305 as a surface 215, filters multiples copies of the stored temporal pattern from the value over time, and determines the distance to the surface 215. For each region 305 having a nonmatching value over time, the computer 105 maintains the current classifications. Finally, the computer 105 actuates a component of the host vehicle 100 based on the classifications and/or the distances. The process 400 continues for as long as the host vehicle 100 remains on.

The process 400 begins in a block 405, in which the computer 105 instructs the illuminator 115 to illuminate according to the stored temporal pattern, as described above.

Next, in a block 410, the computer 105 receives sensor data 300 from the optical sensor 110, as described above.

Next, in a block 415, the computer 105 identifies potential vehicles 210 in the sensor data 300, as described above.

Next, in a block 420, the computer 105 identifies light sources 220 of the potential vehicles 210, as described above.

Next, in a decision block 425, the computer 105 determines whether the light sources 220 from all the potential vehicles 210 have been compared to the stored temporal pattern. The computer 105 may store the potential vehicles 210 in a list and proceed through the list in order. If the computer 105 has not yet reached the last potential vehicle 210 on the list, the computer 105 selects the next potential vehicle 210 on the list, starting with the first potential vehicle 210 on the list, and proceeds to a decision block 430. In response to the most recently selected potential vehicle 210 being the last potential vehicle 210 on the list, the process 400 proceeds to a decision block 445.

In the decision block 430, the computer 105 determines whether the value over time for any of the light sources 220 of the selected potential vehicle 210 matches a stored temporal pattern, as described above. Upon determining that the value over time matches a temporal pattern, the process 400 proceeds to a block 435. Upon determining that the value over time does not match a stored temporal pattern, the process 400 proceeds to a block 440.

In the block 435, the computer 105 classifies the selected potential vehicle 210 as a nonvehicle, as described above. After the block 435, the process 400 returns to the decision block 425 to proceed to the next potential vehicle 210, if any.

In the block 440, the computer 105 classifies the selected potential vehicle 210 as a vehicle, as described above. After the block 440, the process 400 returns to the decision block 425 to proceed to the next potential vehicle 210, if any.

In the decision block 445, the computer 105 determines whether all the regions 305 in the sensor data 300 have been compared to the stored temporal pattern. The computer 105 may store the regions 305 in a list and proceed through the list in order. If the computer 105 has not yet reached the last region 305 on the list, the computer 105 selects the next region 305 on the list, starting with the first region 305 on the list, and proceeds to a decision block 450. In response to the most recently selected region 305 being the last region 305 on the list, the process 400 proceeds to a block 475.

In the decision block 450, the computer 105 determines whether the value over time for the selected region 305 matches the stored temporal pattern, as described above. Upon determining that the value over time matches the stored temporal pattern, the process 400 proceeds to a block 455. Upon determining that the value over time does not match the stored temporal pattern, the process 400 proceeds to a block 470.

In the block 455, the computer 105 classifies the object 205 at the selected region 305 as a surface 215 reflecting a signal from an illuminator 115 of the host vehicle 100, as described above.

Next, in a block 460, the computer 105 filters out extra matches of the stored temporal pattern from the value over time, as described above.

Next, in a block 465, the computer 105 determines the distance to the surface 215, as described above. After the block 465, the process 400 returns to the decision block 445 to proceed to the next region 305, if any.

In the block 470, the computer 105 refrains from classifying the object 205 at the selected region 305 as a surface 215 reflecting the signal from the illuminator 115 of the host vehicle 100, as described above. After the block 470, the process 400 returns to the decision block 445 to proceed to the next region 305, if any.

In the block 475, the computer 105 actuates a component of the host vehicle 100 based on the classifications of the objects 205 in the sensor data 300, as described above.

Next, in a decision block 480, the computer 105 determines whether the host vehicle 100 is still on. In response to the host vehicle 100 being on, the process 400 returns to the block 405 to continue monitoring the sensor data 300. In response to the host vehicle 100 being turned off, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab®, Simulink®, Stateflow®, Visual Basic®, JavaScript®, Python®, Perl®, HTML, etc. Some of these applications may be compiled and executed on a virtual machine, such as the Java™ Virtual Machine, the Dalvik Virtual Machine™, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first," "second," etc. are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   determine a value over time derived from a region of sensor data from an optical sensor of a host vehicle;
   determine that the value over time matches a stored temporal pattern, the stored temporal pattern being an encoding in a signal from an illuminator of an origin vehicle;
   upon determining that the value over time matches the stored temporal pattern, classify an object at the region as a surface reflecting the signal from the illuminator of the origin vehicle; and
   actuate a component of the host vehicle based on a classification of the object at the region.

2. The computer of claim 1, wherein the origin vehicle is the host vehicle, and the instructions further include instructions to instruct the illuminator to illuminate according to the stored temporal pattern.

3. The computer of claim 1, wherein the stored temporal pattern is a visible light communication (VLC) signal.

4. The computer of claim 3, wherein the VLC signal is a pulse-based transmission.

5. The computer of claim 1, wherein the instructions further include instructions to identify a potential vehicle in the sensor data, the region being part of the potential vehicle.

6. The computer of claim 5, wherein the instructions further include instructions to, upon determining that the value over time matches the stored temporal pattern, classify the potential vehicle as a nonvehicle.

7. The computer of claim 5, wherein the instructions further include instructions to, upon determining that the value over time does not match the stored temporal pattern, classify the potential vehicle as a vehicle.

8. The computer of claim 5, wherein the instructions further include instructions to identify a light source of the potential vehicle, the region corresponding to the light source.

9. The computer of claim 8, wherein the instructions further include instructions to, upon determining that the value over time derived from a second region of the sensor data matches the stored temporal pattern, refrain from classifying the potential vehicle as a nonvehicle, the second region corresponding to a portion of the potential vehicle other than the light source.

10. The computer of claim 1, wherein the instructions further include instructions to determine a phase offset between the value over time and the stored temporal pattern.

11. The computer of claim 10, wherein the instructions further include instructions to determine a distance to the surface based on the phase offset.

12. The computer of claim 1, wherein the instructions further include instructions to determine that the value over time includes multiple matches of the stored temporal pattern, and upon determining that the value over time includes multiple matches of the stored temporal pattern, filter out one match of the stored temporal pattern from the value over time.

13. The computer of claim 12, wherein the instructions further include instructions to determine phase offsets of the matches, and select one match of the matches to filter out based on the phase offsets.

14. The computer of claim 1, wherein the value over time is an intensity value.

15. The computer of claim 1, wherein the optical sensor is a camera.

16. The computer of claim 1, wherein the origin vehicle is the host vehicle, and the illuminator is incorporated into the optical sensor.

17. The computer of claim 16, wherein the optical sensor is one of a lidar or a radar.

18. The computer of claim 1, wherein the origin vehicle is the host vehicle, and the illuminator is at least one of a headlight, a daytime running light, a taillight, or a turn signal of the host vehicle.

19. The computer of claim 1, wherein the component of the host vehicle includes at least one of a brake system or a steering system.

20. A method comprising:
    determining a value over time derived from a region of sensor data from an optical sensor of a host vehicle;
    determining that the value over time matches a stored temporal pattern, the stored temporal pattern being an encoding in a signal from an illuminator of an origin vehicle;
    upon determining that the value over time matches the stored temporal pattern, classifying an object at the region as a surface reflecting the signal from the illuminator of the origin vehicle; and
    actuating a component of the host vehicle based on a classification of the object at the region.

* * * * *